United States Patent
Lee et al.

(10) Patent No.: US 11,169,127 B2
(45) Date of Patent: Nov. 9, 2021

(54) METHOD FOR MEASURING THE CONCENTRATION OF ALIPHATIC HYDROXY OXIME AND NEODECANOIC ACID BY GAS CHROMATOGRAPHY

(71) Applicant: KOREA RESOURCES CORPORATION, Wonju-si (KR)

(72) Inventors: Seung Ho Lee, Ansan-si (KR); Bong Keun Jung, Wonju-si (KR); Jeon Woong An, Wonju-si (KR); Youn Kyu Yi, Wonju-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 359 days.

(21) Appl. No.: 16/435,995

(22) Filed: Jun. 10, 2019

(65) Prior Publication Data
US 2020/0386727 A1 Dec. 10, 2020

(51) Int. Cl.
*G01N 30/86* (2006.01)
*B01J 20/281* (2006.01)
*G01N 30/02* (2006.01)

(52) U.S. Cl.
CPC ....... *G01N 30/8665* (2013.01); *G01N 30/482* (2013.01); *G01N 30/8679* (2013.01); *G01N 2030/025* (2013.01)

(58) Field of Classification Search
None
See application file for complete search history.

(56) References Cited

U.S. PATENT DOCUMENTS

| | | | | |
|---|---|---|---|---|
| 4,120,817 A | * | 10/1978 | Hummelstedt | C22B 3/404 252/364 |
| 2008/0038168 A1 | * | 2/2008 | Cheng | C22B 23/0453 423/24 |
| 2019/0011408 A1 | * | 1/2019 | Noda | G01N 30/8631 |

OTHER PUBLICATIONS

Barnard, K.R. et al., "LIX 63 Stability in the Presence of Versatic 10Under Proposed Commercial Extract and Strip Conditions, Part II: Oxime Isomer Inter-Conversion and the Effect of Oxime Degradation Products on Selected Physical Properties", Hydrometallurgy, vol. 91, 2008, pp. 11-19.*

* cited by examiner

*Primary Examiner* — Daniel S Larkin
(74) *Attorney, Agent, or Firm* — Cantor Colburn LLP

(57) ABSTRACT

Provided is a method for measuring the concentration of aliphatic hydroxy oxime and neodecanoic acid using gas chromatography. The method includes the steps of: (a) removing, from a reference material containing an extractant and a diluent, the diluent using a silica column; (b) generating a calibration curve by calculating each peak area of aliphatic hydroxy oxime and neodecanoic acid, which are extractants, by peak integration of gas chromatograms; and (c) calculating the peak area of the organic solvent used in DSX process through the steps (a) and (b) and comparing the peak area with the calibration curve of the step (b) to measure the concentration of aliphatic hydroxy oxime and neodecanoic acid.

4 Claims, 3 Drawing Sheets

FIG. 1

(a) removing, from a reference material containing an extractant and a diluent, the diluent using a silica column;

(b) generating a calibration curve by calculating each peak area of aliphatic hydroxy oxime and neodecanoic acid, which are extractants, by peak integration of gas chromatograms

(c) calculating the peak area of the organic solvent used in DSX process through the steps (a) and (b) and comparing the peak area with the calibration curve of the step (b) to measure the concentration of aliphatic hydroxy oxime and neodecanoic acid

METHOD FOR MEASURING THE CONCENTRATION OF ALIPHATIC HYDROXY OXIME AND NEODECANOIC ACID BY GAS CHROMATOGRAPHY

BACKGROUND OF THE INVENTION

1. Field of the Invention

The present invention relates to a method for measuring the concentration of aliphatic hydroxy oxime and neodecanoic acid using gas chromatography, and more particularly, to a method for measuring the concentration of aliphatic hydroxy oxime and neodecanoic acid, which are extractants of cobalt and zinc in Boleo process.

2. Description of the Related Art

The cobalt/zinc extraction process (synergistic solvent extraction, hereinafter referred to as "DSX") is a process of recovering cobalt and zinc simultaneously by mixing two extractants. In this process, aliphatic hydroxy oxime and neodecanoic acid are mixed at an appropriate ratio and used as an extractant.

In order to minimize the function degradation of the extractant during the operation of the DSX process and to increase the extraction efficiency, the concentration of the extractant should be measured frequently, and then the concentration and ratio should be maintained.

The gas chromatogram of aliphatic hydroxy oxime shows two peaks of anti-oxime and syn-oxime.

Experiments indicate that the peak area of the anti-oxime is quantitatively changed by the concentration change in the DSX process, but the peak area of the syn-oxime is not changed quantitatively. This means that when either syn-oxime peak alone or both peaks are selected and measured, the results are different. This is why only anti-oxime peak should be selected and measured.

In addition, since neodecanoic acid is an acid, an acid-base titration method can be used, but there is a problem that other acid generated in the process affects the measurement result. This means that the actual concentration of neodecanoic acid can be equal to or higher than the actual one of neodecanoic acid depending on the conditions of the DSX process.

Further, there is a problem of overlapping with the peak of the diluent contained in the solvent (same retention time) on the gas chromatographic measurement of neodecanoic acid. Peak area of pure neodecanoic acid cannot be calculated if peaks of other substances are overlapped. Therefore, neodecanoic acid should be measured after thoroughly removing the diluent from the organic solvent.

SUMMARY OF THE INVENTION

An object of the present invention is to provide an efficient analytical method for measuring the concentrations of aliphatic hydroxy oxime and neodecanoic acid, which are extractants in organic solvents, in the Boleo DSX process.

In order to solve the above problems, the present invention provides a method for measuring the concentrations of aliphatic hydroxy oxime and neodecanoic acid using gas chromatography, the method including the steps of: (a) removing, from a reference material containing an extractant and a diluent, the diluent using a silica column; (b) generating a calibration curve by calculating each peak area of aliphatic hydroxy oxime and neodecanoic acid, which are extractants, by peak integration of gas chromatograms; and (c) calculating the peak area of the organic solvent used in the DSX process through the steps (a) and (b) and comparing the peak area with the calibration curve of the step (b) to measure the concentrations of aliphatic hydroxy oxime and neodecanoic acid.

Further, the present invention provides a method for measuring the concentrations of aliphatic hydroxy oxime and neodecanoic acid, in which in the step (b), the isomers of aliphatic hydroxy oxime are anti-oxime and syn-oxime, and among the two peaks of the isomers, the peak of anti-oxime is selected.

Further, the present invention provides a method for measuring the concentrations of aliphatic hydroxy oxime and neodecanoic acid, in which the diluent is kerosene.

Further, the present invention provides a method for measuring the concentration of aliphatic hydroxy oxime and neodecanoic acid, in which the step (a) includes: passing 2 mL to 5 mL of ethyl acetate through a silica column and injecting air to remove residual ethyl acetate in the silica column, then passing 2 mL to 5 mL of hexane through and injecting air to remove residual hexane in the silica column, thereby washing the silica column; repeating the steps of passing the reference material and injecting air to remove the diluent; and injecting ethyl acetate and air sequentially in the silica column from which the diluent is removed to elute the extractants.

The present invention frequently measures the concentrations of aliphatic hydroxy oxime and neodecanoic acid, which are extractants in organic solvents, in the DSX process and maintains the concentrations and ratio of the extractants, thereby having effects of minimizing function degradation of the extractants and increasing the extraction efficiency.

BRIEF DESCRIPTION OF THE DRAWINGS

FIG. 1 is a flowchart illustrating a method for measuring aliphatic hydroxy oxime neodecanoic acid by gas chromatography according to an embodiment of the present invention.

DETAILED DESCRIPTION OF THE PREFERRED EMBODIMENT

Figure 2:
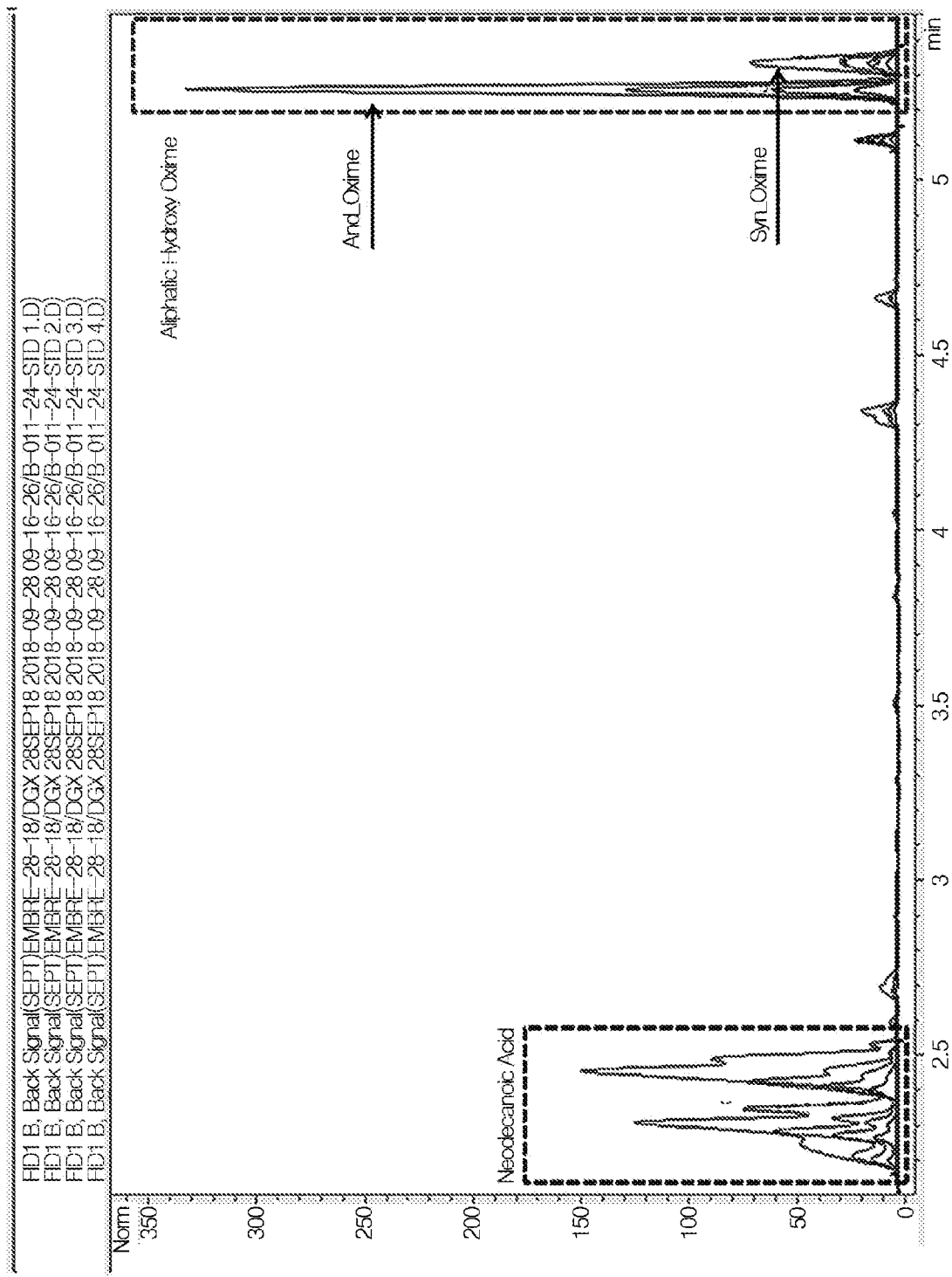
FIG. 2 illustrates the peak area of a chromatogram of a reference material prepared according to an embodiment of the present invention.

Hereinafter, a preferable exemplary embodiment of the present invention is described in more detail. In the following description of the present invention, a detailed description of commonly known functions and configurations incorporated herein is omitted so as to avoid obscuring the subject matter of the present invention.

The terms of degree, such as "about", and "substantially" are used in the present specification in the sense of "at, or nearly at, when given the manufacturing and material tolerances inherent in the stated circumstances" and are used to prevent the unscrupulous infringer from unfairly taking advantage of the invention disclosure where exact or absolute figures are stated as an aid to understanding the invention.

The present invention relates to a method for measuring the concentrations of aliphatic hydroxy oxime and neodecanoic acid using gas chromatography, FIG. 1 is a flowchart illustrating a method for measuring aliphatic hydroxy oxime and neodecanoic acid by gas chromatography according to an embodiment of the present invention.

The present invention includes the following steps:

(a) removing, from a reference material containing an extractant and a diluent, the diluent using a silica column;
(b) generating a calibration curve by calculating each peak area of aliphatic hydroxy oxime and neodecanoic acid, which are extractants, by peak integration of gas chromatograms; and (c) calculating the peak area of the organic solvent used in the DSX process through the steps (a) and (b) and comparing the peak area with the calibration curve of the step (b) to measure the concentrations of aliphatic hydroxy oxime and neodecanoic acid.

In the step (a), the reference material for calibration curves and DSX process organic solvents also contain the extractant and the diluent kerosene together. Since the DSX process organic solvent contains about 0.5% to about 5.0% of aliphatic hydroxy oxime and neodecanoic acid, but is present together with other organic substances (kerosene), the chromatogram is very complicated.

Further, since peaks of neodecanoic acid and kerosene as diluent appear at the same position (same retention time), it is almost impossible to distinguish neodecanoic acid peak area from kerosene peak area.

In the step (b), a calibration curve is prepared for measuring the concentration v/v % of each of aliphatic hydroxy oxime and neodecanoic acid of the reference material by gas chromatography.

In order to prepare the calibration curve in the step (b), a reference material should be prepared, and a commercially available product (aliphatic hydroxy oxime having a purity of about 70% and neodecanoic acid having a purity of about 90%) is used.

The reference material for the calibration curve is prepared by mixing aliphatic hydroxy oxime, neodecanoic acid, and a diluent having a concentration range of about 0.2% by volume to about 5.0% by volume.

In the step (c), the peak area of the organic solvent used in the DSX process is calculated through the steps (a) and (b), and the peak area is compared with the calibration curve of the step (b) to measure the concentrations of aliphatic hydroxy oxime and neodecanoic acid. However, the peak position (retention time) varies depending on the operating conditions of the gas chromatography.

The features and other advantages of the present invention as described above will become more apparent from the following Experimental Examples. The following Experimental Examples are for illustrative purposes only and can not be construed as restricting or limiting the scope of the protective scope of the present invention.

EXPERIMENTAL EXAMPLE

Measurement of the Concentration of Aliphatic Hydroxy Oxime and Neodecanoic Acid Using Gas Chromatography Aliphatic hydroxy oxime and neodecanoic acid as extractants in the DSX process and a diluent were prepared. The extractants are shown in Table 1 below.

In the regard, 5,8-diethyl-7-hydroxy-6-dodecanone oxime was used as an example of the aliphatic hydroxy oxime, but the present invention is not limited thereto.

TABLE 1

| Extractant | Purity (% m/m) | Specific gravity (kg/L) |
| --- | --- | --- |
| Aliphatic hydroxy oxime | 70 or more | 0.88 |
| Neodecanoic Acid | 90 or more | 0.91 |

5 mL aliphatic hydroxy oxime and 5 mL neodecanoic acid were added to a 100 mL volumetric flask, and the volume was adjusted with a diluent to prepare Reference material 4.

10 mL of the reference material 4 solution was placed in a 25 mL volumetric flask, and the volume was adjusted with a diluent to prepare a reference material 3.

5 mL of the reference material 4 solution was placed in a 25 mL volumetric flask, and the volume was adjusted with a diluent to prepare a reference material 2.

2 mL of the reference material 4 solution was added to a 25 mL volumetric flask, and the volume was adjusted with a diluent to prepare a reference material 1.

The concentrations of the reference materials are shown in Table 2 below.

TABLE 2

| Reference material | Aliphatic hydroxy oxime (% v/v) | Neodecanoic acid (% v/v) |
| --- | --- | --- |
| 1 | 0.28 | 0.36 |
| 2 | 0.70 | 0.90 |
| 3 | 1.40 | 1.80 |
| 4 | 3.50 | 4.50 |

In order to isolate the kerosene and extractants, aliphatic hydroxy oxime, and neodecanoic acid from the reference material, 2 mL of ethyl acetate was passed through a silica column, and 50 mL of air was blown thereinto to remove ethyl acetate.

2 mL of hexane was passed through the silica column, and 50 mL of air was blown thereinto to remove hexane. The silica column was washed by this process.

0.200 g of the reference material was injected into the silica column, and 20 mL of air was blown thereinto to pass the kerosene.

2.5 mL of hexane was passed through the silica column, and 50 mL of air was blown thereinto. This procedure was repeatedly performed for the complete elimination of kerosene.

3 mL of ethyl acetate was injected into the silica column, resulting in elution, and the eluent was collected in a 5 mL volumetric flask. 50 mL of air was injected for complete elution. Then, methanol was added to the volumetric flask to adjust the volume to 5 mL.

A calibration curve was prepared using the reference material 1, the reference material 2, the reference material 3 and the reference material 4.

Further, the water of the DSX organic solvent was removed, and the DSX organic solvent was subjected to the same procedure. However, the amount of organic solvent to be injected can be adjusted according to the concentration of aliphatic hydroxy oxime and neodecanoic acid.

Figure 3:
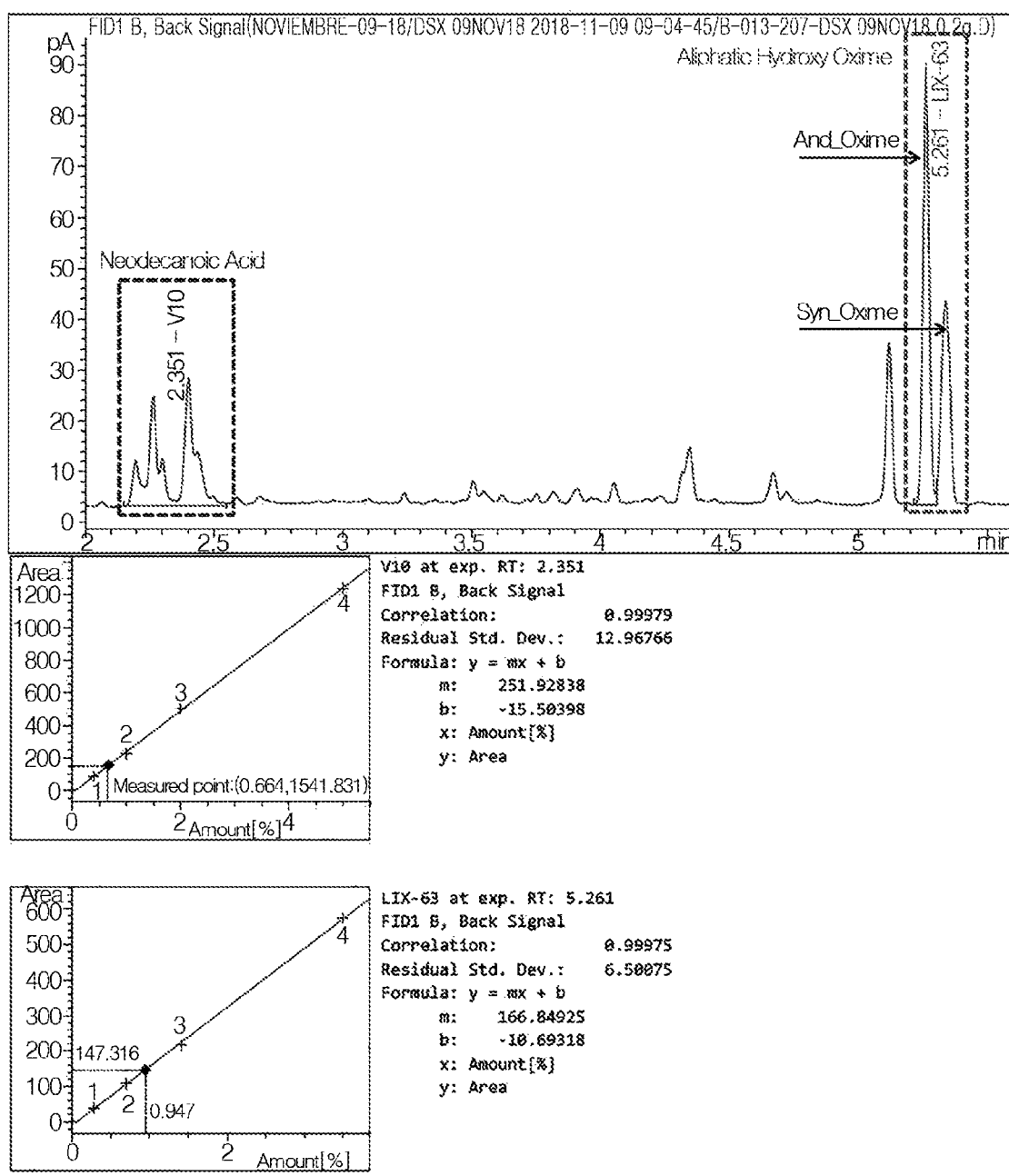
FIG. 3 illustrates a process of calculating a concentration value (v/v %) of an organic solvent using a calibration curve generated according to an embodiment of the present invention.

FIG. 3 illustrates a process of calculating a concentration value (v/v %) of an organic solvent using a calibration curve generated according to an embodiment of the present invention.

The peaks of aliphatic hydroxy oxime and neodecanoic acid were selected in the gas chromatogram of the reference material, and the peak area was calculated by peak integration so that a linear equation of the calibration curve was obtained. In the case of aliphatic hydroxy oxime, there are two peaks of anti-oxime and syn-oxime as isomers.

Since the relative sizes of the isomeric anti-oxime and syn-oxime peaks vary depending on the conditions, only the anti-oxime peak was selected by peak integration. Further, the peak area of the DSX organic solvent was substituted into the above-mentioned linear equation to calculate the concentration.

In the first graph in FIG. 3, peaks of neodecanoic acid and anti-oxime were distinguished by gas chromatogram of the organic solvent as a measured substance. The values of the respective peak areas could be calculated from the respective content values (x-axis values) by the calibration curve of the neodecanoic acid in the second graph and the calibration curve of the anti-oxime in the third graph.

It will be apparent to those skilled in the art that the present invention as described above is not limited to the above-described Examples and accompanying drawings, and that various substitutions, modifications and variations can be made in the present invention without departing from the spirit or scope of the inventions.

What is claimed is:

1. A method for measuring the concentration of aliphatic hydroxy oxime and neodecanoic acid using gas chromatography, the method comprising the steps of:
   (a) removing, from a reference material containing extractants and a diluent, the diluent using a silica column;
   (b) generating a calibration curve by calculating each peak area of aliphatic hydroxy oxime and neodecanoic acid, which are the extractants, by peak integration of gas chromatograms; and
   (c) calculating the peak areas of an organic solvent used in a synergistic solvent extraction (DSX) process through the steps (a) and (b) and comparing the peak areas with the calibration curve of the step (b) to measure the concentration of aliphatic hydroxy oxime and neodecanoic acid.

2. The method of claim 1, wherein in the step (b), the isomers of aliphatic hydroxy oxime are anti-oxime and syn-oxime, and among two peaks of the isomers, the peak of anti-oxime is selected.

3. The method of claim 1, wherein the diluent is kerosene.

4. The method of claim 1, the step (a) includes:
   passing 2 mL to 5 mL of ethyl acetate through the silica column and injecting air to remove residual ethyl acetate in the silica column,
   then passing 2 mL to 5 mL of hexane through and injecting air to remove residual hexane in the silica column, thereby washing the silica column;
   repeating the steps of passing the reference material and injecting air to remove the diluent; and
   injecting ethyl acetate and air sequentially in the silica column from which the diluent is removed to elute the extractants.

* * * * *